United States Patent
Kodama et al.

(10) Patent No.: US 10,192,443 B2
(45) Date of Patent: Jan. 29, 2019

(54) COLLISION AVOIDANCE SYSTEM AND COLLISION AVOIDANCE METHOD

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP); Hiroshi Saegusa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/508,085

(22) PCT Filed: Sep. 5, 2014

(86) PCT No.: PCT/JP2014/073565
§ 371 (c)(1),
(2) Date: Mar. 1, 2017

(87) PCT Pub. No.: WO2016/035214
PCT Pub. Date: Mar. 10, 2016

(65) Prior Publication Data
US 2017/0309179 A1    Oct. 26, 2017

(51) Int. Cl.
*G08G 1/16*    (2006.01)
*G01S 15/93*    (2006.01)
(Continued)

(52) U.S. Cl.
CPC .............. *G08G 1/166* (2013.01); *G01S 7/003* (2013.01); *G01S 13/931* (2013.01);
(Continued)

(58) Field of Classification Search
None
See application file for complete search history.

(56) References Cited

U.S. PATENT DOCUMENTS 6,263,282 B1    7/2001  Vallancourt
6,650,984 B1 *  11/2003  Rao ................ B60R 21/013
                                                    342/42
(Continued)

FOREIGN PATENT DOCUMENTS

JP    S58-078256    5/1983
JP    H04-054600    2/1992
(Continued)

OTHER PUBLICATIONS

International Search Report for International Application No. Yuji Kodama dated Dec. 9, 2014, 4 pages, Japan.

*Primary Examiner* — Chico A Foxx
(74) *Attorney, Agent, or Firm* — Thorpe North & Western

(57) ABSTRACT

A host vehicle is provided with a detection device that detects the behavior of an object in the surroundings of the host vehicle in a non-contact manner. The host vehicle is also provided with the following: a warning device that performs a warning operation pertaining to a warning directed at a following vehicle that is traveling behind the host vehicle; and a control device that controls the warning device on the basis of the result of detection by the detection device. The control device controls the warning device so as to perform the warning operation in a case where the result of detection by the detection device indicates that the behavior of an object in the surroundings of the host vehicle corresponds to an unnatural behavioral pattern.

13 Claims, 6 Drawing Sheets

(51) Int. Cl.
    *G01S 17/93*     (2006.01)
    *G01S 7/00*     (2006.01)
    *G01S 13/93*     (2006.01)

(52) U.S. Cl.
    CPC .......... *G01S 15/931* (2013.01); *G01S 17/936* (2013.01); *G08G 1/162* (2013.01); *G01S 2013/936* (2013.01); *G01S 2013/9325* (2013.01); *G01S 2013/9353* (2013.01); *G01S 2013/9364* (2013.01); *G01S 2013/9367* (2013.01); *G01S 2013/9375* (2013.01)

(56) References Cited

U.S. PATENT DOCUMENTS

| | | | |
|---|---|---|---|
| 7,859,391 B1* | 12/2010 | Solis | B60Q 1/503 340/425.5 |
| 2007/0013497 A1* | 1/2007 | Watanabe | B60Q 9/008 340/435 |
| 2007/0152803 A1* | 7/2007 | Huang | B60Q 1/525 340/435 |
| 2007/0164896 A1* | 7/2007 | Suzuki | 342/70 |
| 2007/0296564 A1 | 12/2007 | Howell et al. | |
| 2008/0040004 A1* | 2/2008 | Breed | B60R 21/0134 701/45 |
| 2008/0189040 A1* | 8/2008 | Nasu | G08G 1/163 701/301 |
| 2009/0102698 A1* | 4/2009 | Ichiyanagi | G01S 13/348 342/70 |
| 2011/0313664 A1 | 12/2011 | Sakai et al. | |
| 2012/0235853 A1* | 9/2012 | Takeuchi | B60W 30/09 342/71 |
| 2013/0038437 A1* | 2/2013 | Talati | B60K 35/00 340/438 |
| 2013/0169425 A1* | 7/2013 | Victor | B60Q 1/525 340/435 |
| 2013/0268184 A1 | 10/2013 | Zagorski et al. | |
| 2014/0009617 A1* | 1/2014 | Utagawa | G06K 9/00825 348/148 |
| 2014/0035774 A1* | 2/2014 | Khlifi | G01S 7/006 342/21 |
| 2014/0049644 A1* | 2/2014 | Deigmoeller | H04N 7/18 348/148 |
| 2014/0163859 A1* | 6/2014 | Tsuchida | G01S 13/931 701/301 |
| 2014/0236414 A1 | 8/2014 | Droz et al. | |
| 2014/0341434 A1* | 11/2014 | Lin | G08G 1/166 382/104 |
| 2016/0137126 A1* | 5/2016 | Fürsich | B60R 1/00 348/38 |
| 2016/0347310 A1* | 12/2016 | Moran | B60W 30/09 |
| 2016/0363935 A1* | 12/2016 | Shuster | B60L 7/10 |
| 2017/0248949 A1* | 8/2017 | Moran | B60W 30/085 |
| 2017/0248950 A1* | 8/2017 | Moran | G08G 1/165 |

FOREIGN PATENT DOCUMENTS

| | | | | |
|---|---|---|---|---|
| JP | H05-024492 | 2/1993 | | |
| JP | H07-044800 | 2/1995 | | |
| JP | 2010-271906 | 12/2010 | | |
| JP | 2012-128561 | 7/2012 | | |
| JP | 2012-206689 | 10/2012 | | |
| WO | WO 2008/002756 | 1/2008 | | |
| WO | WO 2009043418 A1 * | 4/2009 | ......... | B60R 21/0134 |
| WO | WO 2010/089661 | 8/2010 | | |
| WO | WO 2014/130178 | 8/2014 | | |

* cited by examiner

COLLISION AVOIDANCE SYSTEM AND COLLISION AVOIDANCE METHOD

TECHNICAL FIELD

The present technology relates to a collision avoidance system and a collision avoidance method.

BACKGROUND ART

Warning a following vehicle in the case where there is the possibility of a collision can be considered as a method for avoiding a collision between a host vehicle and the following vehicle.

Japanese Unexamined Patent Application Publication No. 2010-271906A discloses a driving assistance device that prevents the occurrence of driving errors caused by tailgating by a following vehicle. With the device according to Japanese Unexamined Patent Application Publication No. 2010-271906A, it is determined that tailgating is occurring when a state in which an inter-vehicle distance is less than or equal to a predetermined inter-vehicle distance continues for greater than or equal to a predetermined fixed length of time.

However, there are cases where the occurrence of tailgating cannot be correctly determined simply by determining the inter-vehicle distance and the duration. Furthermore, there are other types of dangerous driving aside from tailgating, and there are situations where such dangerous driving cannot be determined by the inter-vehicle distance and the duration. Therefore, reliably detecting unnatural behavior in vehicles and the like in the surroundings of the host vehicle and making a warning is thought to be important with respect to increasing the likelihood of avoiding a collision between a host vehicle and a following vehicle.

SUMMARY

The present technology provides a collision avoidance system and a collision avoidance method capable of increasing the likelihood of avoiding a collision between a host vehicle and a following vehicle.

A collision avoidance system according to an aspect of the present technology includes a detection device, a warning device, and a control device. The detection device is provided in a host vehicle and detects behavior of an object in the surroundings of the host vehicle in a non-contact manner. The warning device carries out a warning operation pertaining to a warning directed at a following vehicle traveling behind the host vehicle. The control device controls the warning device on the basis of a detection result from the detection device. The control device controls the warning device to carry out the warning operation in the case where the behavior of the object indicated by the detection result corresponds to an unnatural behavioral pattern.

Preferably, the control device includes a storage unit, a behavior analysis unit, and a comparison unit. The storage unit stores behavior data pertaining to the unnatural behavioral pattern. The behavior analysis unit analyzes the behavior of the object on the basis of the detection result. The comparison unit compares the behavior data stored in the storage unit with analysis result data corresponding to an analysis result from the behavior analysis unit, and controls the warning device in the case where a result of the comparison made by the comparison unit indicates that the analysis result data and the behavior data match.

Preferably, the object in the surroundings of the host vehicle is another vehicle aside from the host vehicle. The unnatural behavioral pattern includes at least one of a behavioral pattern indicating it is possible that a driver has fallen asleep at the wheel, a behavioral pattern indicating it is possible that a driver is intoxicated, and a behavioral pattern corresponding to dangerous driving. The storage unit stores data pertaining to the unnatural behavioral pattern exhibited by the another vehicle as the behavior data.

The detection device may include a radar unit that outputs, as the detection result, a measurement signal based on reflection waves received after emitting electromagnetic waves toward the object in the surroundings of the host vehicle. The behavior analysis unit may carry out predetermined computational processing on the basis of the measurement signal and output a result of the computational processing as the analysis result data.

The behavior analysis unit may carry out a computation for finding a change or a rate of change in a value indicated by the measurement signal.

The detection device may include an imaging unit that captures an image of the object in the surroundings of the host vehicle, and outputs, as the detection result, an image signal based on the image captured by the imaging unit. The behavior analysis unit may carry out predetermined image processing on an image based on the image signal and output a result of the image processing as the analysis result data.

The behavior analysis unit may carry out a computation for finding a change or a rate of change in a value found from the image based on the image signal.

The object may include a following vehicle traveling behind the host vehicle.

The object may include a leading vehicle traveling in front of the host vehicle.

The warning operation may include at least one of an operation of making a predetermined display directed at the following vehicle and an operation of outputting a predetermined sound directed at the following vehicle.

The warning operation may include an operation of transmitting, to the following vehicle, a signal for causing another warning device provided in the following vehicle to operate.

The control device may further include a cancellation unit that stops execution of the warning operation on the basis of a detection result for the behavior of the host vehicle.

A collision avoidance method according an aspect of the present technology includes: a first step of detecting behavior of an object in the surroundings of a vehicle in a non-contact manner by a detection device provided in the vehicle; a second step of determining whether or not the behavior of the object indicated by a detection result from the first step corresponds to an unnatural behavioral pattern by a control device; and a third step of carrying out a warning operation pertaining to a warning for a following vehicle traveling behind the vehicle on the basis of a determination result from the second step by a warning device.

According to the collision avoidance system and the collision avoidance method of the present technology, an appropriate inter-vehicle distance between a host vehicle and a following vehicle can be maintained by making a warning to the following vehicle, which increases the likelihood of avoiding a collision between the host vehicle and the following vehicle.

DETAILED DESCRIPTION

Figure 1:
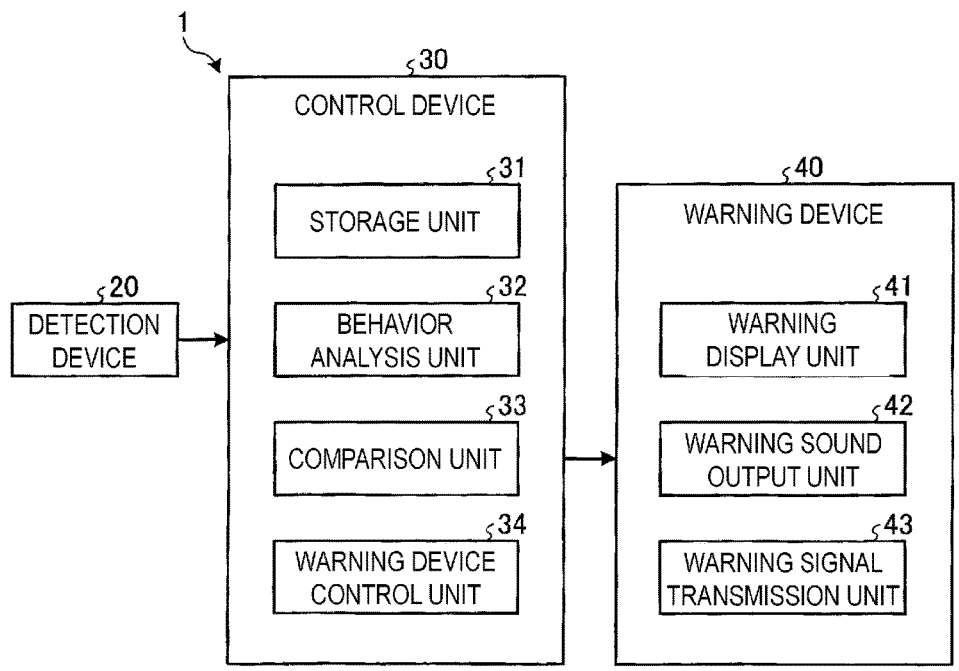
FIG. 1 is a function block diagram illustrating a collision avoidance system according to an embodiment.

Embodiments of the present technology will be described in detail below with reference to the drawings. However, the present technology is not intended to be limited by the embodiments. Furthermore, components of the embodiments include components that may be easily replaced by those skilled in the art or that are substantially identical to components of the embodiments. In addition, some of the constituents may not be used in some cases.
Collision Avoidance System FIG. 1 is a function block diagram illustrating a collision avoidance system according to the present embodiment. As illustrated in FIG. 1, a collision avoidance system 1 according to the present embodiment is provided in a vehicle, and includes a detection device 20, a control device 30, and a warning device 40.

The detection device 20 detects the behavior of an object in the surroundings of the vehicle (host vehicle) in a non-contact manner. The object in the surroundings of the host vehicle includes a vehicle traveling in the surroundings of the host vehicle, such as a following vehicle traveling behind the host vehicle, a leading vehicle traveling in front of the host vehicle, or both the following vehicle and the leading vehicle. In addition to a vehicle traveling directly behind the host vehicle, the following vehicle to be detected by the detection device 20 may be a vehicle traveling at the diagonal-rear or the side of the host vehicle as well, for example. In addition to a vehicle traveling directly in front of the host vehicle, the leading vehicle to be detected by the detection device 20 may be a vehicle traveling at the diagonal-front or the side of the host vehicle as well, for example. The following will describe a case where the object in the surroundings of the host vehicle is a vehicle, or in other words, is a vehicle aside from the host vehicle.

The detection device 20 includes a radar device (a millimeter wave radar device, a Doppler radar device). The radar device is capable of detecting whether or not an object is present behind a host vehicle 10 by emitting radio waves (or ultrasonic waves) and then receiving the radio waves (or ultrasonic waves) reflected by the object. In addition to whether or not an object is present, the radar device is capable of detecting a relative position of the object (a relative distance and orientation) and a relative velocity of the object. Note that the detection device 20 may include at least one of a laser scanner and a three-dimensional rangefinder. The detection device 20 may include an imaging device (a camera) capable of detecting an object in a non-contact manner by acquiring an optical image of the object. The detection device 20 carries out detection at a predetermined cycle (every one second, for example).

The control device 30 controls the warning device 40 on the basis of a detection result from the detection device 20. The control device 30 controls the warning device 40 so as to perform a warning operation in a case where the detection result from the detection device 20 indicates that the behavior of an object corresponds to a predetermined unnatural behavioral pattern. The control device 30 includes a storage unit 31, a behavior analysis unit 32, a comparison unit 33, and a warning device control unit 34.

The storage unit 31 stores behavior data pertaining to unnatural behavioral patterns. The unnatural behavioral patterns include at least one of a behavioral pattern indicating it is possible that a driver has fallen asleep at the wheel, a behavioral pattern indicating it is possible that a driver is intoxicated, and a behavioral pattern corresponding to dangerous driving such as meandering, traveling on the shoulder, or sudden acceleration/deceleration, and the like, for example. The storage unit 31 stores data pertaining to such unnatural behavioral patterns.

More specifically, detection results obtained by the detection device 20 in cases where vehicles have traveled in such unnatural behavioral patterns are acquired in advance, and the storage unit 31 stores data corresponding to those detection results. For example, the detection results can be acquired from the detection device 20 by actually driving two vehicles. The data corresponding to the unnatural behavioral patterns may also be generated through vehicle travel simulations.

The behavior analysis unit 32 analyzes the behavior of a vehicle aside from the host vehicle by carrying out predetermined processing on the basis of the detection result from the detection device 20, and outputs analysis result data for the behavioral pattern. The predetermined processing is, for example, computational processing of a measurement signal obtained by radar or image processing of an image obtained through image capturing.

The comparison unit 33 compares the behavior data stored in the storage unit 31 with the analysis result data corresponding to the analysis result from the behavior analysis unit 32. The warning device control unit 34 controls the warning device 40 to make a warning in the case where a result of the comparison made by the comparison unit 33 indicates that the analysis result data and the behavior data match.

The warning device 40 carries out a warning operation pertaining to a warning directed at a following vehicle traveling behind the host vehicle. The warning device 40 includes a warning display unit 41, a warning sound output unit 42, and a warning signal transmission unit 43.

The warning display unit 41 makes a warning by lighting a lamp, displaying an image, or the like, for example. Here, the lamp is not limited to a lamp originally provided in the vehicle to satisfy traffic regulations. In addition to lighting the lamp, the display of the image may be carried out by flashing a lamp (for example, flashing the brake lamps). The display of the image is carried out by displaying a predetermined message in a display device using known LEDs, a liquid crystal display, or the like, for example.

The warning sound output unit 42 makes a warning by outputting a warning sound. The warning sound includes synthesized voice.

The warning signal transmission unit 43 wirelessly transmits a control signal for causing another warning device provided in another vehicle such as the following vehicle to operate to that vehicle.

The vehicle that has received the control signal from the warning signal transmission unit 43 operates the warning device provided in that vehicle and makes a warning to the driver of that vehicle.

Figure 2:
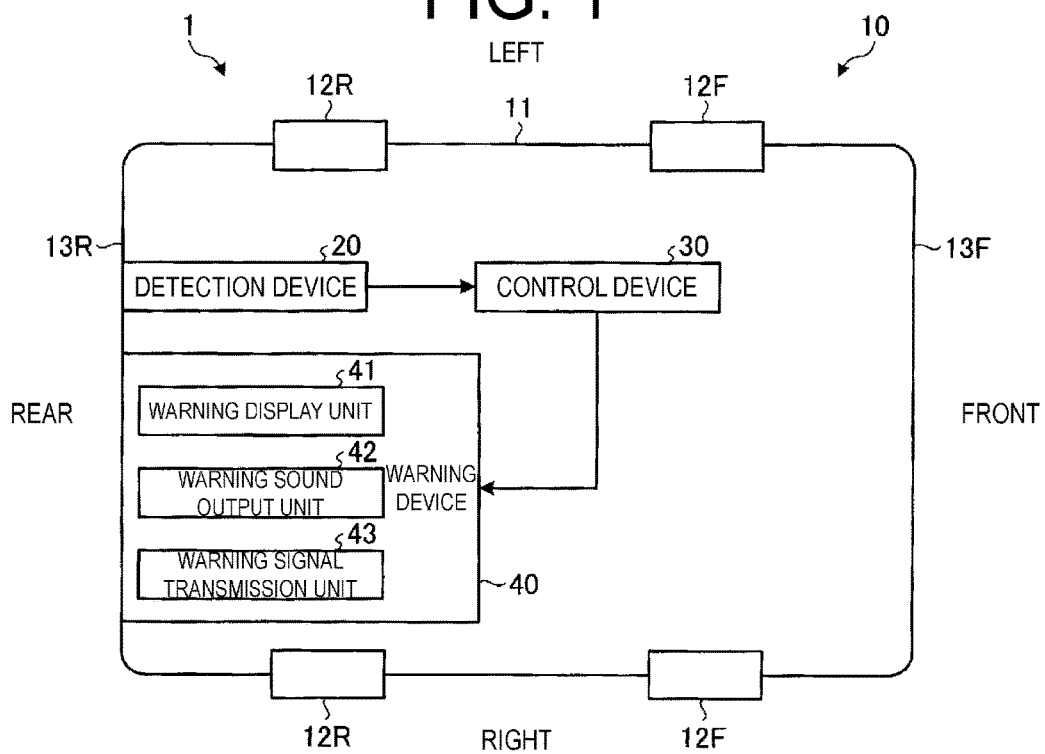
FIG. 2 is a diagram schematically illustrating an example of a vehicle in which the collision avoidance system according to the embodiment is provided.

FIG. 2 is a diagram schematically illustrating an example of a vehicle in which the collision avoidance system according to the present embodiment is provided.

As illustrated in FIG. 2, the host vehicle 10 is a four-wheeled vehicle in the present embodiment. The host vehicle 10 has two front wheels 12F and two rear wheels 12R. The host vehicle 10 has a driver cab that a driver occupies.

The host vehicle 10 includes the detection device 20 arranged in a rear part 13R of a vehicle body 11. Therefore, the detection device 20 can detect a following vehicle traveling behind the host vehicle 10 in a non-contact manner. In addition to a vehicle traveling directly behind the host vehicle, the detection device 20 may detect a vehicle traveling at the diagonal-rear or the side as well, for example, in a non-contact manner.

Detection of Behavior Using Radar

Figure 3:
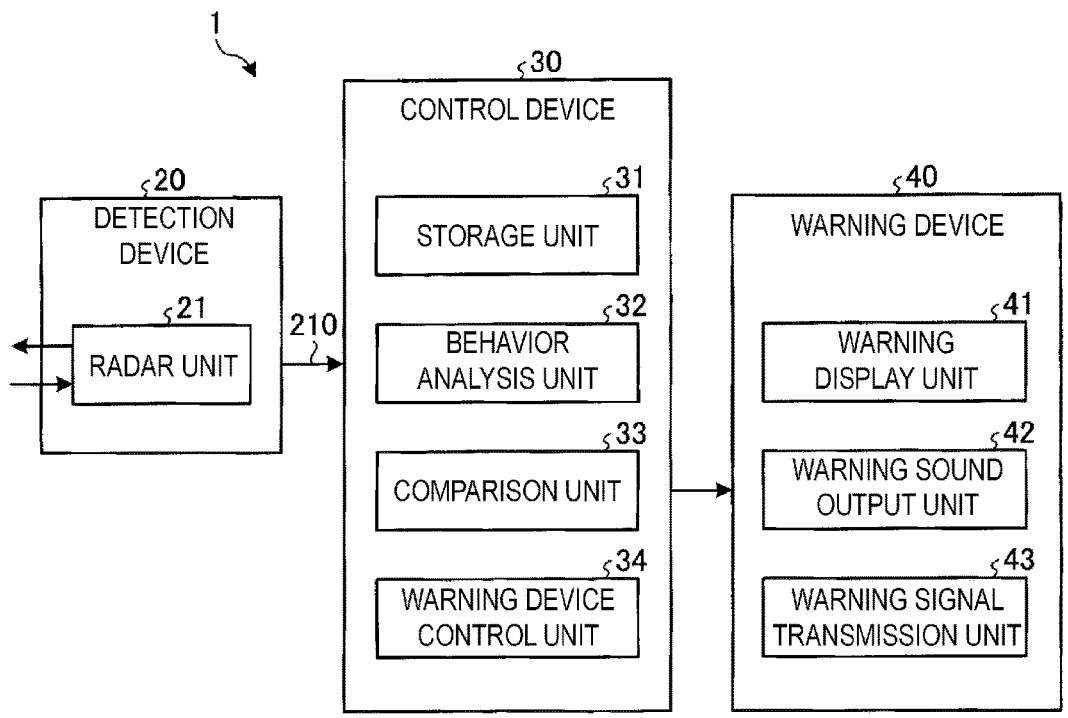
FIG. 3 is a function block diagram illustrating the collision avoidance system in a case where behavior is detected using radar.

FIG. 3 is a function block diagram illustrating the collision avoidance system in a case where behavior is detected using radar. As illustrated in FIG. 3, the collision avoidance system 1 according to this example includes a radar unit 21 in the detection device 20. The radar unit 21 includes, for example, a radar device (a millimeter wave radar device or a Doppler radar device, for example).

The radar unit 21 includes a transmitter and a receiver (not illustrated), and can measure whether or not another vehicle is present behind or in front of the host vehicle 10 by emitting radio waves (or ultrasonic waves) and then receiving the radio waves (or ultrasonic waves) reflected by the object. In the case where the radar unit 21 is provided in the rear part 13R of the vehicle, a following vehicle is the object to be measured. In the case where the radar unit 21 is provided in a front part 13F of the vehicle, a leading vehicle is the object to be measured.

In addition to whether or not a vehicle is present, the radar unit 21 can also measure relative positions (relative distances and orientations) of the host vehicle 10 and the other vehicle, as well as a relative velocity between the host vehicle 10 and the other vehicle. Note that the radar unit 21 may include at least one of a laser scanner and a three-dimensional rangefinder.

The detection device 20 outputs a measurement result obtained by the radar unit 21 as a measurement signal 210. The measurement signal 210 is the detection result from the detection device 20. The measurement signal 210 is inputted to the control device 30.

The behavior analysis unit 32 of the control device 30 sequentially carries out the predetermined computational processing on the measurement signal 210. For example, in the case where the measurement signal 210 indicates the relative positions of the host vehicle 10 and another vehicle, the behavior analysis unit 32 may carry out a computation for finding a difference from a value of the measurement signal 210, or in other words, the relative distances and orientations, inputted the previous time (that is, a change in the value), or finding a rate of change in the relative distances and orientations. Meanwhile, for example, in the case where the measurement signal 210 indicates the relative velocity between the host vehicle 10 and another vehicle, the behavior analysis unit 32 may carry out a computation for finding a difference from the relative velocity indicated by the measurement signal 210 inputted the previous time or a rate of change in the relative velocity.

The behavior analysis unit 32 stores a predetermined number of computation results, and outputs a pattern in the change of the above-described difference or a pattern in the change in the above-described rate of change found in the predetermined number of computations as the behavioral pattern analysis result data.

The comparison unit 33 compares the behavior data stored in the storage unit 31 with the analysis result data corresponding to the analysis result from the behavior analysis unit 32.

The storage unit 31 stores, in advance, data used for comparison with the analysis result data outputted by the behavior analysis unit 32, or in other words, behavior data pertaining to unnatural behavioral patterns. The unnatural behavioral patterns include a behavioral pattern indicating it is possible that a driver has fallen asleep at the wheel, a behavioral pattern indicating it is possible that a driver is intoxicated, a behavioral pattern corresponding to dangerous driving such as meandering, traveling on the shoulder, or sudden acceleration/deceleration, and the like, for example.

Here, a pattern in which a difference or rate of change in the relative orientation of another vehicle increases gradually can be given as an example of a behavioral pattern indicating it is possible that the driver has fallen asleep at the wheel. A pattern in which a difference or rate of change in the relative orientation of another vehicle rises and falls repeatedly can be given as an example of a behavioral pattern indicating it is possible that the driver is intoxicated. A pattern in which a difference or a rate of change from the relative distance and orientation of another vehicle changes suddenly or a pattern in which a difference from the relative velocity or a rate of change in the relative velocity of another vehicle changes suddenly can be given as examples of behavioral patterns indicating dangerous driving such as meandering, traveling on the shoulder, or sudden acceleration/deceleration.

The comparison unit 33 reads out the behavior data pertaining to the unnatural behavioral patterns from the storage unit 31 and compares the read-out behavior data with the analysis result data corresponding to the analysis result from the behavior analysis unit 32. The warning device control unit 34 controls the warning device 40 to make a warning in the case where a result of the comparison made by the comparison unit 33 indicates that the analysis result data and the behavior data match.

Figure 4:
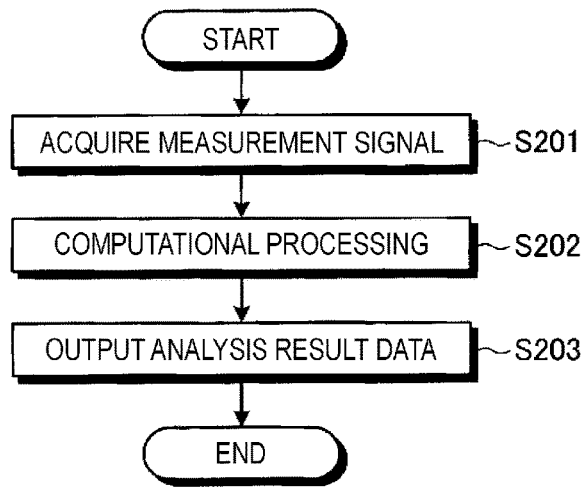
FIG. 4 is a flowchart illustrating an example of processing performed by a behavior analysis unit in a case where the collision avoidance system illustrated in FIG. 3 detects behavior using radar.

FIG. 4 is a flowchart illustrating an example of processing performed by the behavior analysis unit 32 in a case where the collision avoidance system 1 illustrated in FIG. 3 detects behavior using radar. As illustrated in FIG. 4, the behavior analysis unit 32 acquires the measurement signal 210 corresponding to the measurement result from the radar unit 21 (step S201). Next, the behavior analysis unit 32 carries out the above-described computational processing on the measurement signal 210 (step S202).

The behavior analysis unit 32 stores a predetermined number of computation results, and outputs a pattern in the change of the above-described difference or a pattern in the change in the above-described rate of change found in the predetermined number of computations as the behavioral pattern analysis result data (step S203).

Through this processing, the collision avoidance system 1 can detect the behavior of the other vehicle using radar and make a warning to the following vehicle in the case where the behavior corresponds to an unnatural behavioral pattern.

Detection of Behavior Using Image Processing

Figure 5:
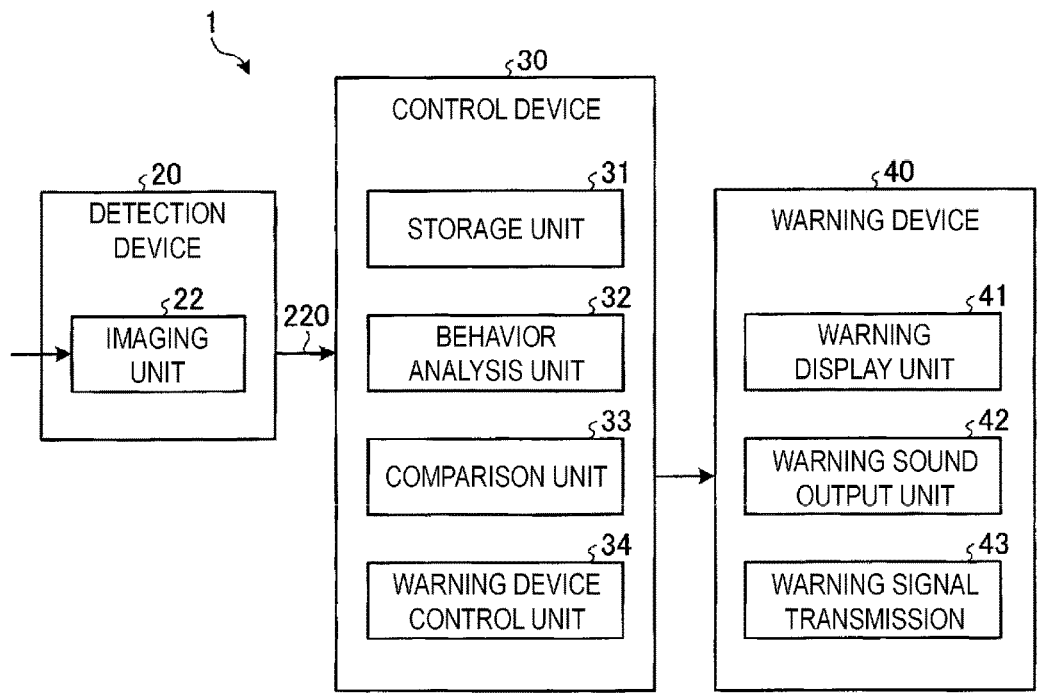
FIG. 5 is a function block diagram illustrating the collision avoidance system in a case where behavior is detected through image processing.

FIG. 5 is a function block diagram illustrating the collision avoidance system in a case where behavior is detected through image processing. As illustrated in FIG. 5, the collision avoidance system 1 according to this example includes an imaging unit 22 in the detection device 20.

The imaging unit 22 captures an image of an object in the surroundings of the host vehicle and acquires an optical image of the object. In the case where the imaging unit 22 is provided in the rear part 13R of the vehicle, an image of the following vehicle is captured. In the case where the imaging unit 22 is provided in the front part 13F of the vehicle, an image of the leading vehicle is captured. The detection device 20 outputs an image signal 220 based on the image captured by the imaging unit 22. The image signal 220 is the detection result from the detection device 20. The image signal 220 is inputted to the control device 30.

The behavior analysis unit 32 of the control device 30 sequentially carries out the predetermined image processing on an image based on the image signal 220. The behavior analysis unit 32 may carry out a process for finding the relative position (relative distance and orientation) of another vehicle from the image based on the image signal 220, for example.

Alternatively, the behavior analysis unit 32 may carry out a process for finding the relative velocity of another vehicle from the image based on the image signal 220, for example.

The behavior analysis unit 32 may carry out a process for finding a distance from a white line or a yellow line indicated on a road from the image based on the image signal 220, for example.

Alternatively, the behavior analysis unit 32 may carry out a process for finding a distance from a wall on the side of a road from the image based on the image signal 220, for example. Walls on the side of roads are often provided on highways. Therefore, a process for finding a distance from a wall on the side of the road may be carried out in the case where the host vehicle 10 is traveling on a highway. Whether the host vehicle 10 is traveling on a highway may be determined from information from a car navigation system (not illustrated) installed in the host vehicle 10, from position information obtained from a GPS, a record of passing through a gate of an electronic toll collection system (ETC), or the like.

The behavior analysis unit 32 may carry out a computation for finding a difference from a value found during the processing, or in other words, the relative positions of the host vehicle 10 and the other vehicle, carried out the previous time (that is, a change in the value), or finding a rate of change in the relative positions.

The behavior analysis unit 32 may carry out a computation for finding a difference from the relative velocity between the host vehicle 10 and the other vehicle found from the processing carried out the previous time, or finding a rate of change in the relative velocity.

The behavior analysis unit 32 stores a predetermined number of computation results, and outputs a pattern in the change of the above-described difference or a pattern in the change in the above-described rate of change found in the predetermined number of computations as the behavioral pattern analysis result data.

The comparison unit 33 compares the behavior data stored in the storage unit 31 with the analysis result data corresponding to the analysis result from the behavior analysis unit 32.

The storage unit 31 stores, in advance, data used for comparison with the analysis result data outputted by the behavior analysis unit 32, or in other words, behavior data pertaining to unnatural behavioral patterns. The unnatural behavioral patterns include a behavioral pattern indicating it is possible that a driver has fallen asleep at the wheel, a behavioral pattern indicating it is possible that a driver is intoxicated, a behavioral pattern corresponding to dangerous driving such as meandering, traveling on the shoulder, or sudden acceleration/deceleration, and the like, for example.

Here, a pattern in which a difference or rate of change in the relative orientation of another vehicle increases gradually can be given as an example of a behavioral pattern indicating it is possible that the driver has fallen asleep at the wheel. A pattern in which a difference or rate of change in the relative orientation of another vehicle rises and falls repeatedly can be given as an example of a behavioral pattern indicating it is possible that the driver is intoxicated. A pattern in which a difference or a rate of change from the relative distance and orientation of another vehicle changes suddenly or a pattern in which a difference from the relative velocity or a rate of change in the relative velocity of another vehicle suddenly changes can be given as examples of behavioral patterns indicating dangerous driving such as meandering, traveling on the shoulder, or sudden acceleration/deceleration.

The comparison unit 33 reads out the behavior data pertaining to the unnatural behavioral patterns from the storage unit 31 and compares the read-out behavior data with the analysis result data corresponding to the analysis result from the behavior analysis unit 32. The warning device control unit 34 controls the warning device 40 to make a warning in the case where a result of the comparison made by the comparison unit 33 indicates that the analysis result data and the behavior data match.

Figure 6:
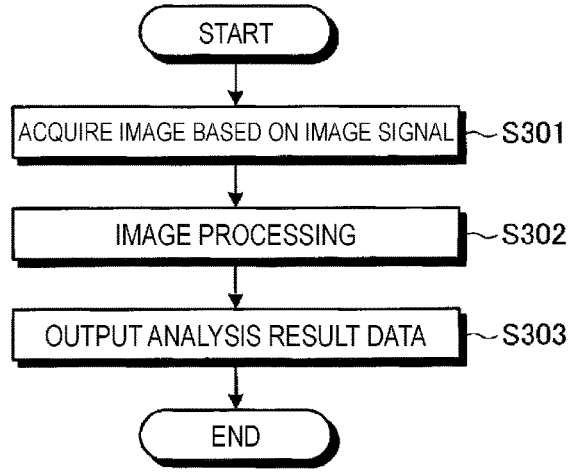
FIG. 6 is a flowchart illustrating an example of processing performed by the behavior analysis unit in a case where the collision avoidance system illustrated in FIG. 5 detects behavior through image processing.

FIG. 6 is a flowchart illustrating an example of processing performed by the behavior analysis unit 32 in a case where the collision avoidance system 1 illustrated in FIG. 5 detects behavior using image processing. As illustrated in FIG. 6, the behavior analysis unit 32 acquires the image signal 220 corresponding to the image capturing result from the imaging unit 22 (step S301). Next, the behavior analysis unit 32 carries out the above-described image processing on the image signal 220 (step S302).

The behavior analysis unit 32 stores a predetermined number of computation results obtained through the image processing, and outputs a pattern in the change of the above-described difference or a pattern in the change in the above-described rate of change found in the predetermined number of computations as the behavioral pattern analysis result data (step S303).

Detecting Behavior of Following Vehicle

Figure 7:
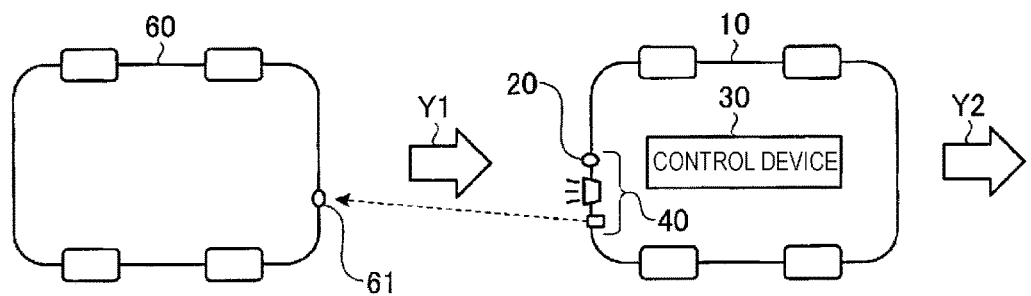
FIG. 7 is a diagram schematically illustrating operations performed by the collision avoidance system illustrated in FIG. 2.

FIG. 7 is a diagram schematically illustrating operations performed by the collision avoidance system illustrated in FIG. 2. In FIG. 7, arrows Y1 and Y2 indicate traveling directions of a following vehicle 60 and the host vehicle 10. As illustrated in FIG. 7, the detection device 20 of the host vehicle 10 detects the behavior of the following vehicle 60 in a non-contact manner. The control device 30 controls the warning device 40 on the basis of a detection result from the detection device 20.

In the case where the detection result from the detection device 20 corresponds to a predetermined unnatural behavioral pattern, the control device 30 controls the warning device 40 to carry out a warning operation pertaining to a warning directed at the following vehicle 60.

As described earlier, the warning device 40 makes a warning directed at the following vehicle 60 using the warning display unit 41 or the warning sound output unit 42.

A warning can be made to the following vehicle 60 through the above-described processing in the case where the behavior of the following vehicle 60 is unnatural. As a result, the driver of the following vehicle 60 can be notified that his/her behavior is unnatural, and the driver of the following vehicle 60 can be expected to operate the brakes or let up on the accelerator, thus making it possible to maintain an appropriate inter-vehicle distance.

Additionally, the warning device 40 may wirelessly transmit a control signal from the warning signal transmission unit 43 to the following vehicle 60. The following vehicle 60 receives the control signal from the warning signal transmission unit 43 using a receiving unit 61, operates a warning device (not illustrated) provided in the following vehicle 60 and makes a warning to the driver of the following vehicle 60. As a result, the driver of the following vehicle 60 can be expected to operate the brakes or let up on the accelerator, thus making it possible to maintain an appropriate inter-vehicle distance. Note that the following vehicle 60 that has received the control signal from the warning signal transmission unit 43 may operate the brakes or let up on the accelerator regardless of operations performed by the driver.

Detecting Behavior of Leading Vehicle

Figure 8:
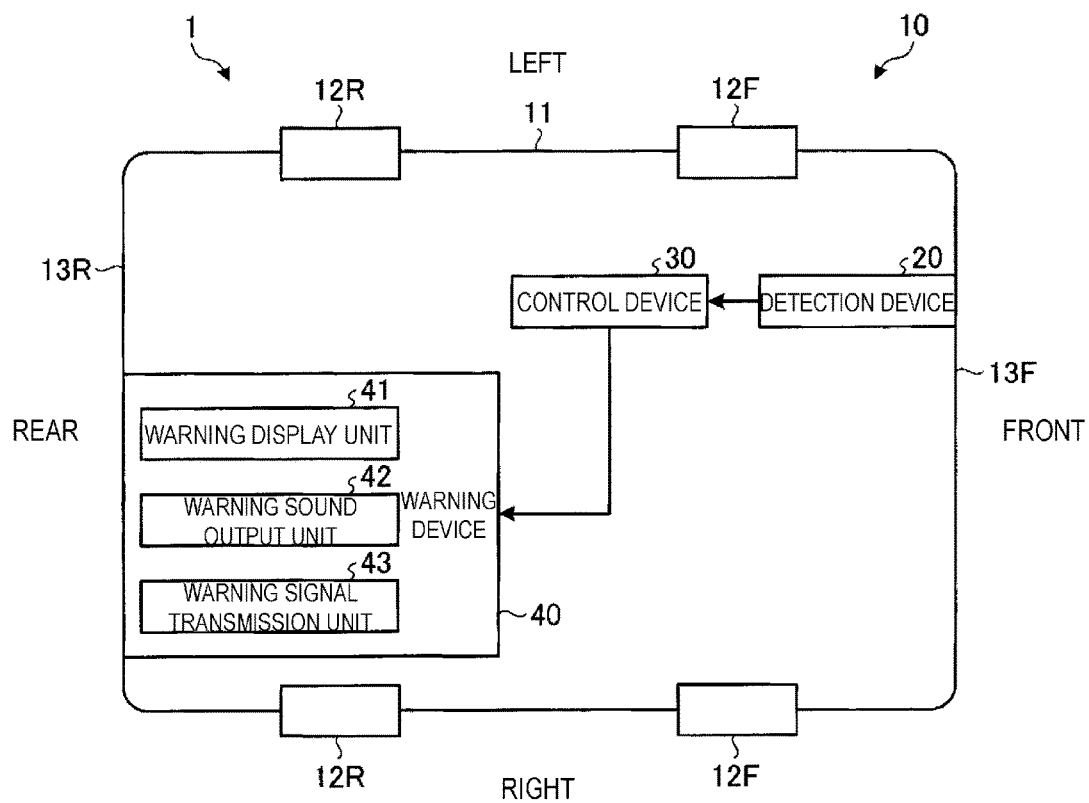
FIG. 8 is a diagram schematically illustrating another example of a vehicle in which the collision avoidance system according to an embodiment is provided.

FIG. 8 is a diagram schematically illustrating another example of a vehicle in which the collision avoidance system is provided, according to the present embodiment. In FIG. 8, the configurations and operations of the detection device 20, the control device 30, and the warning device 40 are the same as those described with reference to FIGS. 3 to 6.

As illustrated in FIG. 8, the present embodiment differs from the example illustrated in FIG. 2 in that the host vehicle 10 includes the detection device 20 arranged in the front part 13F of the vehicle body 11. Therefore, the detection device 20 can detect a leading vehicle traveling in front of the host vehicle 10 in a non-contact manner. In addition to a vehicle traveling directly in front of the host vehicle, the detection device 20 may detect a vehicle traveling at the diagonal-front or the side as well, for example, in a non-contact manner.

Figure 9:
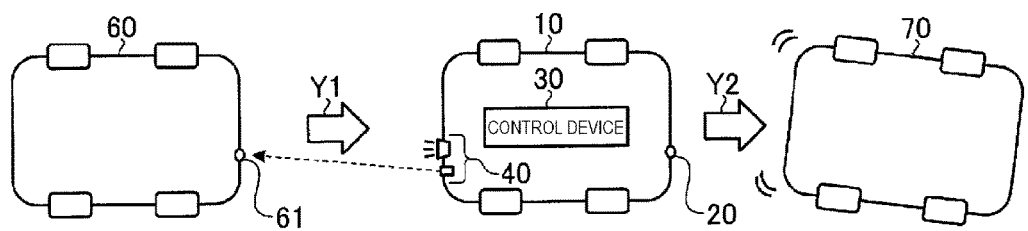
FIG. 9 is a diagram schematically illustrating operations performed by the collision avoidance system illustrated in FIG. 8.

FIG. 9 is a diagram schematically illustrating operations performed by the collision avoidance system illustrated in FIG. 8. In FIG. 9, arrows Y1 and Y2 indicate traveling directions of the following vehicle 60 and the host vehicle 10. As illustrated in FIG. 9, the detection device 20 of the host vehicle 10 detects the behavior of a leading vehicle 70 in a non-contact manner. The control device 30 controls the warning device 40 on the basis of a detection result from the detection device 20.

In the case where the detection result from the detection device 20 corresponds to a predetermined unnatural behavioral pattern, the control device 30 controls the warning device 40 to carry out a warning operation pertaining to a warning directed at the following vehicle 60.

As described earlier, the warning device 40 makes a warning directed at the following vehicle 60 using the warning display unit 41 or the warning sound output unit 42.

Through the processing described above, the host vehicle 10 may apply the brakes suddenly or make an evasive maneuver in the case where the behavior of the leading vehicle 70 is unnatural, and thus the following vehicle 60 can be warned in advance. Accordingly, the driver of the following vehicle 60 can be expected to operate the brakes or let up on the accelerator, thus making it possible to maintain an appropriate inter-vehicle distance.

Additionally, the warning device 40 may wirelessly transmit a control signal from the warning signal transmission unit 43 to the following vehicle 60. The following vehicle 60 receives the control signal from the warning signal transmission unit 43 using the receiving unit 61, operates a warning device (not illustrated) provided in the host vehicle 10, and makes a warning to the driver of the host vehicle 10. As a result, the driver of the following vehicle 60 can be expected to operate the brakes or let up on the accelerator, thus making it possible to maintain an appropriate inter-vehicle distance. Note that the following vehicle 60 that has received the control signal from the warning signal transmission unit 43 may operate the brakes or let up on the accelerator regardless of operations performed by the driver.

First Modified Example

In the collision avoidance system 1 described above, an unnatural behavioral pattern is detected on the basis of the relative positions of or the relative velocity between the host vehicle and another vehicle.

Here, a case where the host vehicle merges into a line of other vehicles, such as when the host vehicle merges into a main lane of a highway, will be described. In such a case, there are situations where the difference or the rate of change in the relative positions of or the relative velocity between the host vehicle and another vehicle change suddenly.

In such a case, acceleration of the host vehicle 10 in a lateral direction (a direction orthogonal to a travel direction) may be detected, and in the case where an acceleration exceeding a predetermined threshold has been detected, the warning device 40 may not make a warning even in the case where an unnatural behavioral pattern has been detected.

Figure 10:
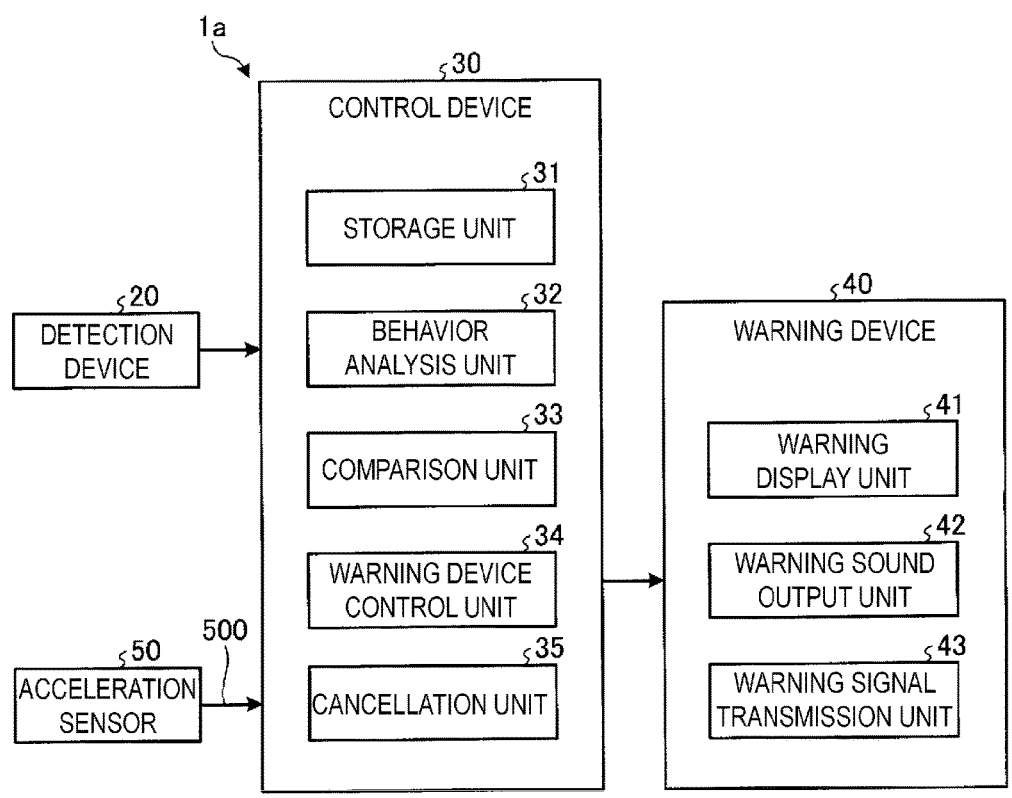
FIG. 10 is a function block diagram illustrating a collision avoidance system that does not make a warning using the warning device even in a case where an unnatural behavioral pattern has been detected.

FIG. 10 is a function block diagram illustrating a collision avoidance system 1a that does not make a warning using the warning device 40 even in a case where an unnatural behavioral pattern has been detected. As illustrated in FIG. 10, the collision avoidance system 1a has a configuration in which an acceleration sensor 50 and a cancellation unit 35 are added to the configuration illustrated in FIG. 1.

The acceleration sensor 50 detects acceleration of the host vehicle 10 in a lateral direction (a direction orthogonal to the travel direction) and outputs an acceleration signal 500 indicating a value of the acceleration.

The cancellation unit 35 is provided in the control device 30. The cancellation unit 35 cancels the control of the warning device 40 by the warning device control unit 34 in the case where the value of the acceleration indicated by the acceleration signal 500 exceeds a predetermined threshold value. In other words, a case where the value of the acceleration indicated by the acceleration signal 500 exceeds the predetermined threshold value corresponds to a case where the host vehicle 10 is merging into a line of other vehicles or the like, and thus the behavior of the other vehicles is not actually unnatural. Therefore, the control of the warning device 40 by the warning device control unit 34 is stopped in such a case. In other words, the control device 30 stops the execution of the warning operation on the basis of the detection result regarding the behavior of the host vehicle 10.

Second Modified Example

The detection device 20 may be provided with both the radar unit 21 and the imaging unit 22, and the warning device control unit 34 may causes the warning device 40 to operate only in the case where data from the measurement result based on the measurement signal 210 (the relative positions or relative velocity) corresponds to an unnatural behavioral pattern and data from the measurement result based on the image signal 220 (the relative positions or relative velocity) corresponds to an unnatural behavioral pattern.

Third Modified Example

The collision avoidance system 1 may find both the relative velocity between the host vehicle 10 and the leading vehicle 70 and the relative velocity between the host vehicle 10 and the following vehicle 60, and may detect unnatural behavior on the basis of a difference between those relative velocities or a rate of change in the relative velocities.

Fourth Modified Example

Additionally, the warning device 40 may make a warning to the following vehicle 60 and may make a warning to the driver of the host vehicle 10. Furthermore, a reporting unit that makes a report to an external organization such as the police, a traffic information center, or the like may be provided.

Collision Avoidance Method

Figure 11:
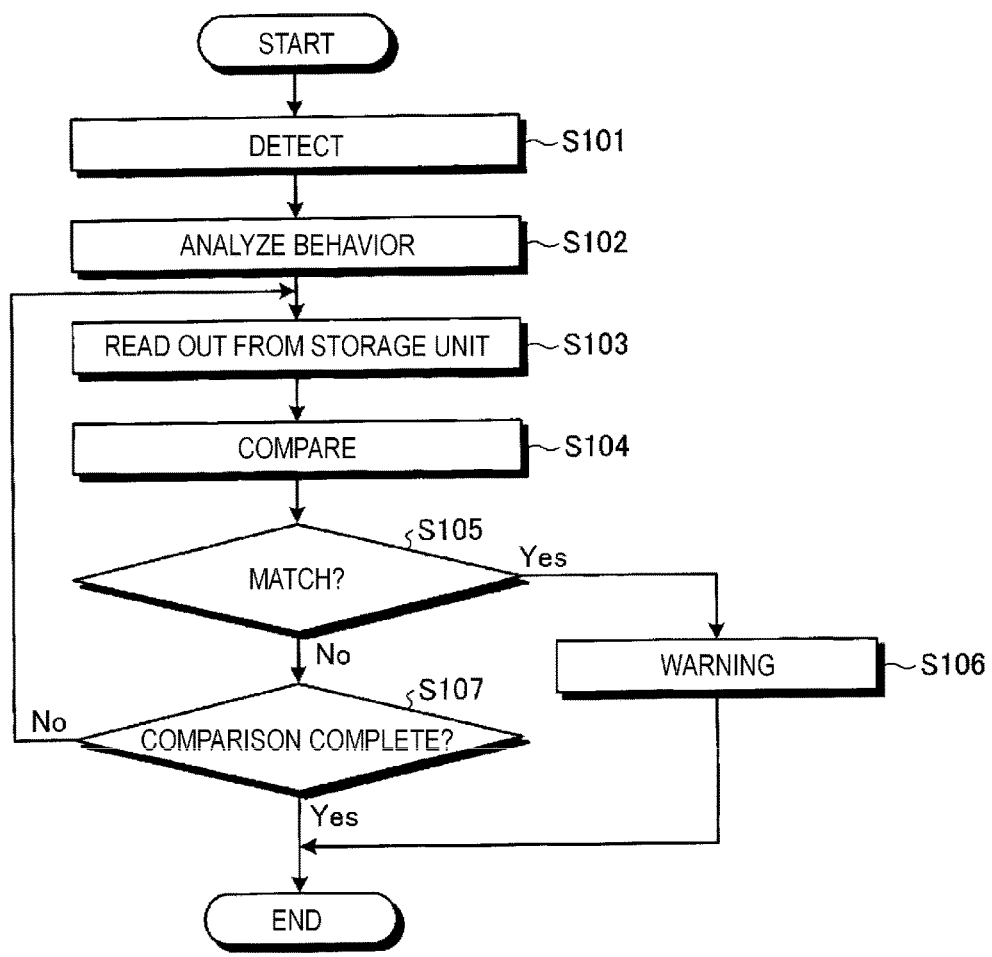
FIG. 11 is a flowchart illustrating an example of a collision avoidance method carried out by the collision avoidance system according to an embodiment.

FIG. 11 is a flowchart illustrating an example of a collision avoidance method carried out by the collision avoidance system according to the present embodiment. As illustrated in FIG. 11, the detection device 20 detects the behavior of an object in the surroundings of a vehicle in a non-contact manner (step S101). The detection device 20 carries out detection at a predetermined cycle (every one second, for example).

Next, the behavior analysis unit 32 analyzes the behavior detected by the detection device 20 (step S102). The comparison unit 33 reads out the behavior data stored in the storage unit 31 (step S103), and compares the behavior data stored in the storage unit 31 with the analysis result data corresponding to the analysis result from the behavior analysis unit 32 (step S104).

In the case where a result of the comparison made by the comparison unit 33 indicates that the analysis result data and the behavior data match (YES in step S105), the warning device control unit 34 controls the warning device 40 to make a warning (step S106). The process then ends.

In the case where the result of the comparison made by the comparison unit 33 indicates that the analysis result data and the behavior data do not match (NO in step S105), the warning device control unit 34 determines whether the comparison is complete for all of the behavior data stored in the storage unit 31 (step S107). In the case where it is determined that the comparison is not complete for all of the behavior data (NO in step S107), the comparison unit 33 reads out another piece of the behavior data stored in the storage unit 31 (step S103), after which the same processing as that described above is carried out.

In the case where it is determined in step S107 that the comparison is complete for all of the behavior data (YES in step S107), the process ends. Note that the processing described above is carried out periodically.

The invention claimed is:

1. A collision avoidance system comprising:
   a detection device that is provided in a host vehicle and detects behavior of a leading vehicle traveling in front of the host vehicle in a non-contact manner, wherein the detection device detects the behavior of the leading vehicle by using at least one of a radar device, a laser scanner, a three-dimensional rangefinder or an imaging device, and wherein the behavior of the leading traveling in front of the host vehicle corresponds to a detected pattern indicating a rate of change of the leading vehicle's orientation relative to the host vehicle;
   a warning device that carries out a warning operation pertaining to a warning directed at a following vehicle traveling behind the host vehicle, the warning corresponding to the behavior of the leading vehicle; and
   a control device that controls the warning device on a basis of a detection result from the detection device, the detection result corresponding to the behavior of the leading vehicle,
   the control device controlling the warning device to carry out the warning operation directed at the following vehicle in a case where the behavior of the leading vehicle indicated by the detection result corresponds to a predetermined unnatural behavioral pattern, wherein the predetermined unnatural behavioral pattern includes at least one of a predetermined behavioral pattern indicating it is possible that a driver of the leading vehicle has fallen asleep while driving, a predetermined behavioral pattern indicating it is possible that the driver of the leading vehicle is intoxicated, or a predetermined behavioral pattern corresponding to dangerous driving performed by the driver of the leading vehicle.

2. The collision avoidance system according to claim 1, wherein the control device includes:
   a storage unit that stores behavior data pertaining to the unnatural behavioral pattern;
   a behavior analysis unit that analyzes the behavior of the object on the basis of the detection result; and
   a comparison unit that compares the behavior data stored in the storage unit with analysis result data corresponding to an analysis result from the behavior analysis unit, and
   the control device controls the warning device in a case where a result of comparison made by the comparison unit indicates that the analysis result data and the behavior data match.

3. The collision avoidance system according to claim 1, wherein the detection device includes a radar unit that outputs, as the detection result, a measurement signal based on reflection waves received after emitting electromagnetic waves toward the leading vehicle; and
   a behavior analysis unit carries out predetermined computational processing on a basis of the measurement signal and outputs a result of the computational processing as analysis result data.

4. The collision avoidance system according to claim 3, wherein the behavior analysis unit carries out a computation for finding a change or a rate of change in a value indicated by the measurement signal.

5. The collision avoidance system according to claim 1, wherein the detection device includes an imaging unit that captures an image of the leading vehicle, and outputs, as the detection result, an image signal based on the image captured by the imaging unit; and a behavior analysis unit carries out predetermined image processing on an image based on the image signal and outputs a result of the image processing as analysis result data.

6. The collision avoidance system according to claim 5, wherein the behavior analysis unit carries out a computation for finding a change or a rate of change in a value found from the image based on the image signal.

7. The collision avoidance system according to claim 1, wherein the warning operation includes at least one of an operation of making a predetermined display directed at the following vehicle and an operation of outputting a predetermined sound directed at the following vehicle.

8. The collision avoidance system according to claim 1, wherein the warning operation includes an operation of transmitting, to the following vehicle, a signal for causing another warning device provided in the following vehicle to operate.

9. The collision avoidance system according to claim 1, wherein the control device further includes a cancellation unit that stops execution of the warning operation on the basis of a detection result for behavior of the host vehicle.

10. The collision avoidance system according to claim 2, wherein the detection device includes a radar unit that outputs, as the detection result, a measurement signal based on reflection waves received after emitting electromagnetic waves toward the leading vehicle; and the behavior analysis unit carries out predetermined computational processing on a basis of the measurement signal and outputs a result of the computational processing as the analysis result data.

11. The collision avoidance system according to claim 10, wherein the behavior analysis unit carries out a computation for finding a change or a rate of change in a value indicated by the measurement signal.

12. The collision avoidance system according to claim 2, wherein the detection device includes an imaging unit that captures an image of the leading vehicle, and outputs, as the detection result, an image signal based on the image captured by the imaging unit; and the behavior analysis unit carries out predetermined image processing on an image based on the image signal and outputs a result of the image processing as the analysis result data.

13. The collision avoidance system according to claim 12, wherein the behavior analysis unit carries out a computation for finding a change or a rate of change in a value found from the image based on the image signal.

* * * * *